United States Patent
Armstrong et al.

(10) Patent No.: US 6,264,184 B1
(45) Date of Patent: Jul. 24, 2001

(54) DOOR CARRIER

(76) Inventors: David Armstrong, P.O. Box 466, Ester, AK (US) 99725; Michael Armstrong, 920 Oak St., Valley Falls, KS (US) 66088

( * ) Notice: Subject to any disclaimer, the term of this patent is extended or adjusted under 35 U.S.C. 154(b) by 0 days.

(21) Appl. No.: 09/440,672

(22) Filed: Nov. 16, 1999

Related U.S. Application Data

(60) Provisional application No. 60/117,238, filed on Jan. 26, 1999.

(51) Int. Cl.$^7$ ...................................................... B25H 1/08
(52) U.S. Cl. ............................ 269/17; 269/904; 269/905; 269/285
(58) Field of Search ............................. 269/17, 299, 157, 269/285, 257, 909, 905; 280/47.131, 47.16, 79.7, 47.24, 47.28, 47.39

(56) References Cited

U.S. PATENT DOCUMENTS

| | | |
|---|---|---|
| D. 310,894 | 9/1990 | Smith . |
| 3,090,635 | 5/1963 | Masterson, Jr. . |
| 3,845,969 | 11/1974 | Nadeau . |
| 3,861,662 | 1/1975 | Morse . |
| 3,871,054 | 3/1975 | Schaefer . |
| 4,043,536 | 8/1977 | Almond . |
| 4,241,930 | 12/1980 | Bell et al. . |
| 4,270,741 | 6/1981 | Hurst . |
| 4,278,244 | 7/1981 | Carter . |
| 4,746,141 | 5/1988 | Willis . |
| 4,793,624 | 12/1988 | Mace . |
| 5,048,806 | 9/1991 | Deutsch . |
| 5,288,090 | 2/1994 | Bross . |

FOREIGN PATENT DOCUMENTS 2002301  2/1979 (GB) .

*Primary Examiner*—Robert C. Watson
(74) *Attorney, Agent, or Firm*—Richard C. Litman

(57) ABSTRACT

A combined door carrier and hanging device for transporting and hanging a door panel is provided. The combined device is generally defined by an elongated carrier structure having a first end and a second end, and includes a wheel supporting chassis to which a pair of beams are mounted and spaced apart to define an elongated slot. The chassis further supports a plurality of floor engaging foot members at the second end, a vise mechanism at the second end, and an axle having a plurality of floor engaging wheels at the first end. More specifically, the elongated slot is adapted to closely receive a door panel across its thickness, wherein one of the pair of beams is rigidly attached the chassis at the first end, but is free to flex at the second end to facilitate clamping of a door panel in the slot. The vise mechanism is attached to the chassis at the second end, which vise when operated compresses the second end of one beam moving the beam toward the other beam, thereby narrowing the slot and hence clamping upon a panel placed therein.

6 Claims, 5 Drawing Sheets

DOOR CARRIER

CROSS-REFERENCE TO RELATED APPLICATION

This application claims the benefit of U.S. Provisional Patent Application Serial No. 60/117,238, filed Jan. 26, 1999.

BACKGROUND OF THE INVENTION

1. FIELD OF THE INVENTION

The present invention relates generally to dolly apparatuses, and more particularly, to a device for transporting and installing a door.

2. DESCRIPTION OF RELATED ART

In the construction of a residence or business office, the fitting and hanging of doors is a difficult and awkward task. The door must, of course, be made to fit the door opening with reasonably close tolerances so that the door can be readily swung open or closed and, when closed, be reasonably snug around all edges. After fitting the door to the opening, hinges must be attached to one edge of the door and to a corresponding door jamb so the door will operate in a desirable manner. All fitting operations and hinge placements require that the door be held firmly on edge, and, unless some type of mechanical jig or vise is employed, it requires two workers to do the job. Accordingly, there has been a need for a mechanical device to hold the door in a suitable position for those operations so that one man may work alone.

Several devices are known to fulfill such purposes. U.S. Pat. Nos. 2,503,388; 2,967,627; 3,643,935; 3,861,662; 4,050,671; and 4,278,244 are illustrative examples. However, these devices, for the most part, include levering means and lifting jack mechanisms, and therefore, are somewhat complicated. Furthermore, all of these devices are rather large and are not collapsible.

Several other patents are also known to describe devices for carrying and installing a conventional door panel. For example, U.S. Pat. No. 3,861,662 issued to Morse on Jan. 21, 1975 describes a combined door carrier and hanging device adapted to support a door panel vertically with the hinged edge of the door in a upper, horizontal position to permit a person to prepare the door for hanging. U.S. Pat. No. 4,746,141 issued to Willis on May 24, 1988 describes a collapsible hand cart for carrying a door standing on edge. U.S. Pat. No. 5,224,309 issued to Bodell on Jul. 6, 1993 describes a cleat for supporting sheet goods during alignment and fastening to underlying support structures. U.S. Pat. No. 5,249,405 issued to Miller on Oct. 5, 1993 describes a drywall support device for temporary support of drywall, such as ceiling installation, during installation. U.S. Pat. No. 5,288,090 issued to Bross on Feb. 22, 1994 describes a door dolly apparatus.

However, none of the above inventions describe a combined door carrier and hanging device having only one vise mechanism for selectively gripping a door inserted therebetween. Additionally, none of the above inventions describe a combined door carrier and hanging device having an longitudinal slot formed therein for receiving one entire side of a door panel therebetween. Moreover, none of the above inventions describe a combined door carrier and hanging device having a longitudinal slot formed in an elongated carrier structure with a vise formed at one end only of the elongated carrier structure for enabling a conventional door panel to be selectively gripped by a substantial length of the longitudinal slot.

None of the above inventions and patents, taken either singly or in combination, is seen to describe the instant invention as claimed.

SUMMARY OF THE INVENTION

The present invention is a combined door carrier and hanging device for transporting and hanging a door panel in an expeditious manner. The combined door carrier and hanging device is generally defined by an elongated carrier structure having a first end and a second end, and includes a wheel supporting chassis to which a pair of beams are mounted and spaced apart to define an elongated slot. The chassis further supports a plurality of floor engaging foot members at the second end, a vise mechanism at the second end, and an axle having a plurality of floor engaging wheels at the first end. More specifically, the elongated slot is adapted to closely receive a door panel across its thickness, wherein one of the pair of beams is rigidly attached the chassis at the first end, but is free to flex at the second end to facilitate clamping of a door panel in the slot. The vise mechanism is attached to the chassis at the second end, which vise when operated compresses the second end of one beam moving the beam toward the other beam, thereby narrowing the slot and hence clamping upon a panel placed therein.

The plurality of floor engaging foot members are mounted on the chassis of the elongated carrier structure at the first end for maintaining the first end in a spaced relation to the floor when at rest in a substantially horizontal orientation. The axle is positioned at the second end supporting the floor engaging wheels, which are dimensioned relative to the foot members in order to maintain the elongated carrier structure horizontal or in a substantially parallel relation with the floor.

Accordingly, it is a principal object of the invention to provide a combined door carrier and hanging device defined by an elongated body having a single vise mechanism at one end thereof for holding a door in the device, thereby simplifying insertion, transportation and removal of the door.

It is another object of the invention to provide a combined door carrier and hanging device having a longitudinal slot formed between a pair of beams for receiving an entire side a conventional door panel.

It is a further object of the invention to provide a combined door carrier and hanging device defined by an elongated body having a longitudinal slot formed therein, the longitudinal slot being adjustable at one end to facilitate insertion and retention of a door panel therein.

Still another object of the invention is to provide a combined door carrier and hanging device having a cushioned layer in the slot for protecting a door panel from scuffing when placed on the base member.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a combined door carrier and hanging device for transporting and hanging a conventional door panel in an expeditious manner. Moreover, the present invention enables a single individual to carry and hang a conventional door without assistance from others.

Figure 1:
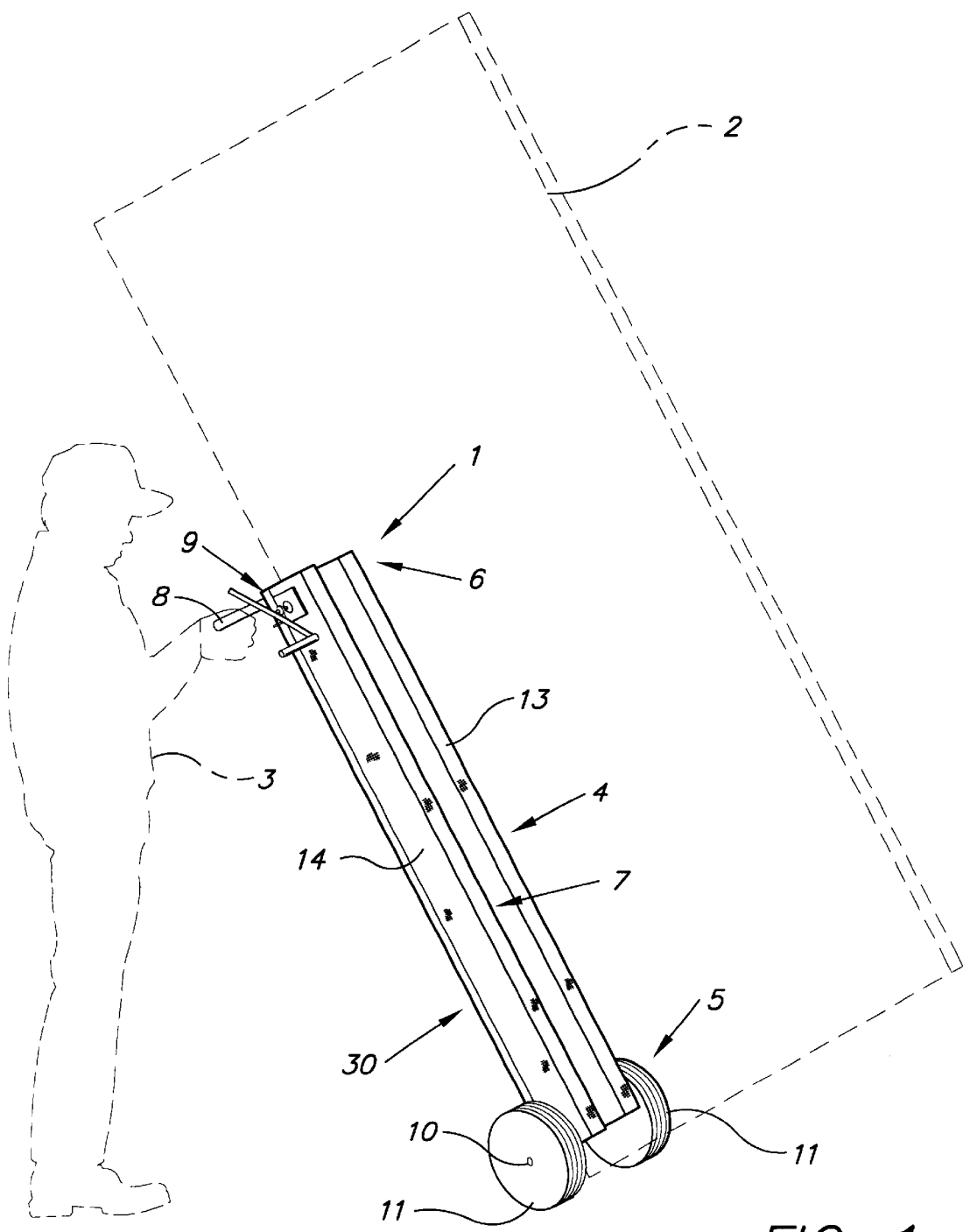
FIG. 1 is an environmental, perspective view of a door carrier according to a preferred embodiment of the present invention.
Figure 2:
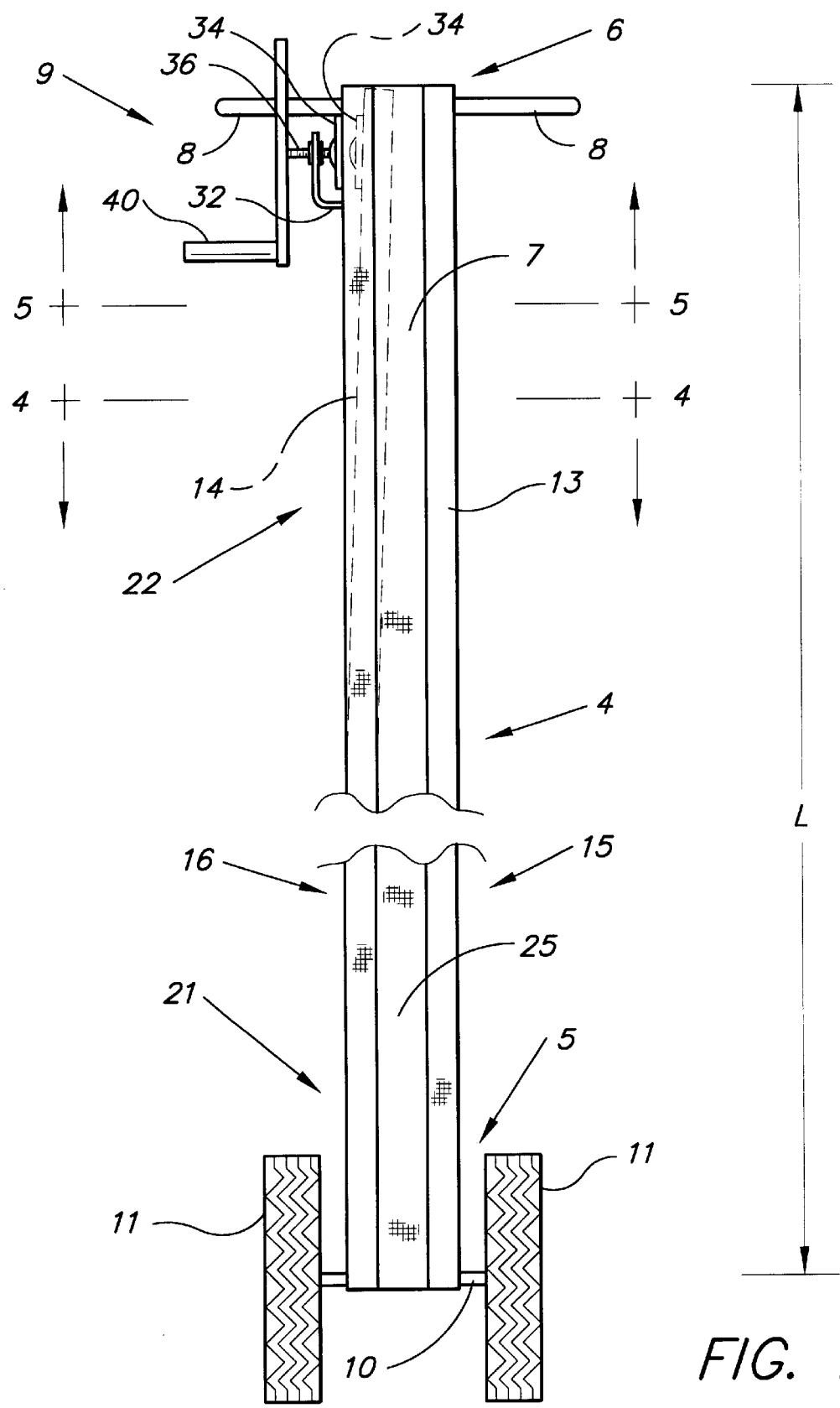
FIG. 2 is a broken, front elevational view of a door carrier according to the preferred embodiment.

FIG. 1 shows an environmental perspective view of a combined door carrier and hanging device 1 according to a preferred embodiment of the present invention. As shown, a conventional door panel 2 can be inserted in the combined door carrier and hanging device 1 to enable the door panel 2 to be easily transported and positioned for hanging by a single individual 3. The combined door carrier and hanging device 1 is generally defined by an elongated carrier structure 4, having a first end 5 and a second end 6, comprising a wheel supporting chassis 30 to which a pair of beams 13,14 are mounted and spaced apart to define an elongated slot 7. At the second end 6, the chassis 30 supports at least one floor engaging foot member 8 at the second end 6 (which serves a double purpose as a handle) and a vise mechanism 9. At the first end 5, the chassis 30 supports an axle 10 having a plurality of floor engaging wheels 11,11.

Figure 3:
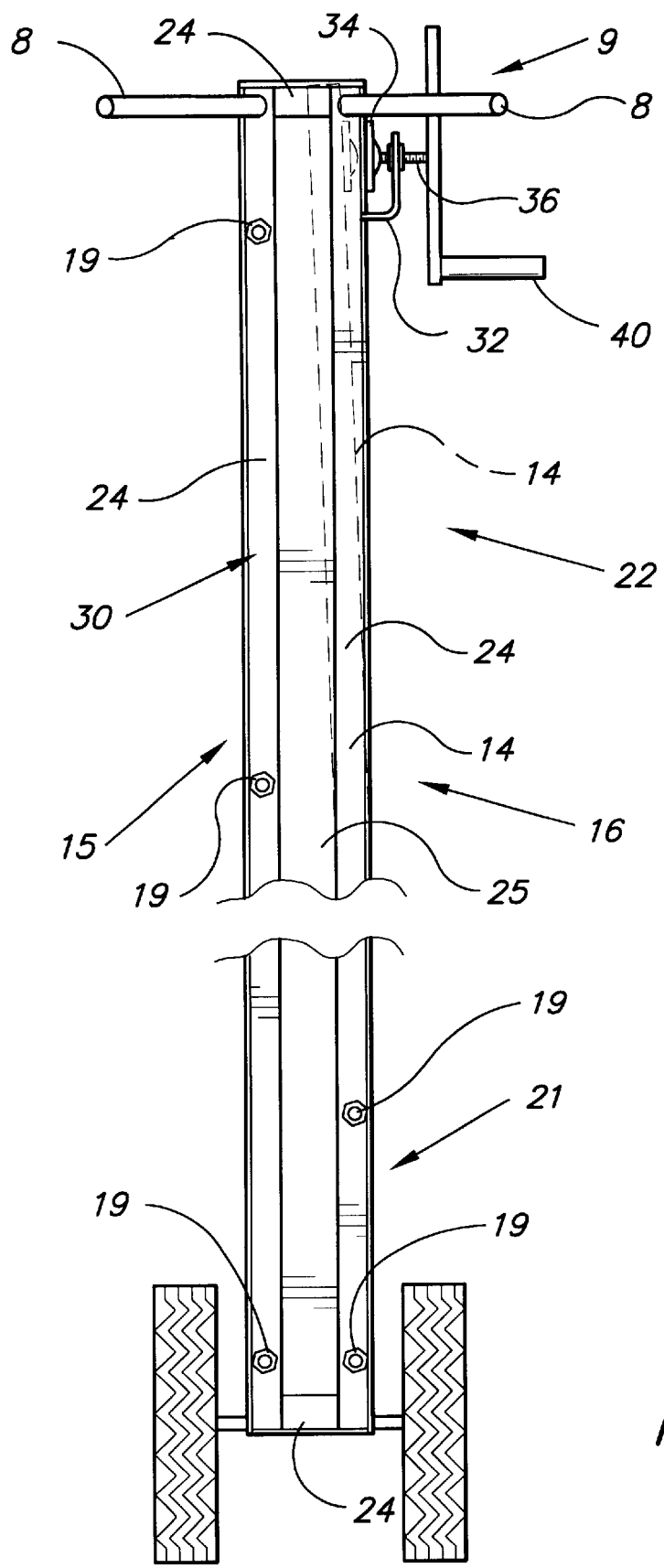
FIG. 3 is a broken, rear elevational view of a door carrier according to the preferred embodiment.
Figure 4:
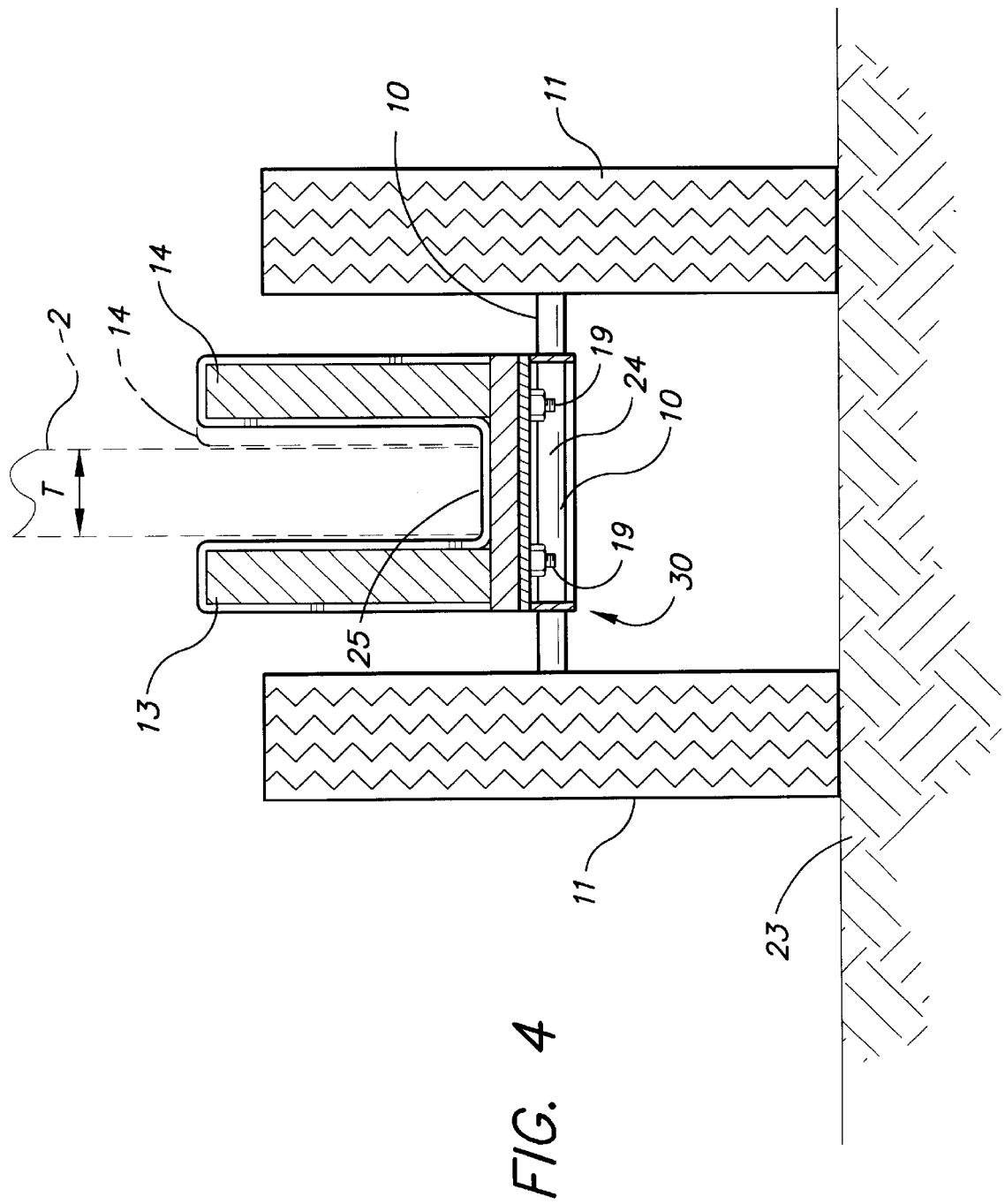
FIG. 4 is a cross-sectional view of the door carrier shown in FIG. 2 taken along line 4—4, showing the carrier in a rest position relative to a ground surface.

Further details relating to the combined door carrier and hanging device 1 may best be appreciated by referring to FIGS. 2–5. More specifically, the elongated slot 7 is sized to closely receive a door panel across its thickness T (as best seen in FIG. 4). Preferably, the elongated slot 7 has a clearance of approximately 2 to 2¼ inches for enabling a conventional door panel 2 to fit snugly inside of the elongated slot 7. Moreover, the size of the elongated carrier structure 4 may be defined by a length L (FIG. 2), preferably approximately 4 feet, over one half of the height of a standard door, to enable a conventional door panel 2 to be inserted into the entire length L of the elongated carrier structure 4.

As seen from FIG. 4 and FIG. 3 together, a first beam 13 preferably is rigidly affixed to the chassis 30 along a first side 15 over a substantial portion of its length L for forming a first rigid structure against which one side of a conventional door panel 2 may be stably supported. The chassis 30 may be formed by a plurality of angle irons 24. According to one preferred embodiment, each angle iron 24 is 1 inch by 1 inch by ⅛ inch in size. Preferably, the first beam 13 is rigidly affixed to the chassis 30 by three conventional nut and bolt assemblies 19 passing transversely through the beam and through a hole in the chassis, and, equally spaced along the length L of the elongated base member 12. Alternatively, a bolt threaded for wood penetration may be used, passing through a hole in the chassis 30 and driven directly into a wooden first beam 13. Other arrangements for providing a rigid wall as described by first beam 13 may also be used.

Both the first beam 13 and the second beam 14 are each made of a rigid material having some resilience to enable both beams to rigidly support a conventional door panel thereon while enabling a free end of one of the beams to bend when subject to a transverse force, thus forming a leaf spring. Preferably, each of the beams are conventional wooden 2×4 inch beams.

Thus in contrast to the first beam 13, the second beam 14 is rigidly affixed to the second side 16 only along a small portion of the length L of the chassis 30. More specifically, the second beam 14 is defined by a first portion 21 and second portion 22. The first portion 21 is rigidly affixed to the second side 16 for forming a rigid portion against which the other side of a conventional door panel 2 may be stably supported. Preferably, the first portion 21 has a length dimension approximately equal to ⅓ of the elongated carrier structure length L. The first portion 21 is rigidly affixed to the second side 16 by a couple of the conventional nut and carriage bolt assemblies 19, passing through a transverse bore in the first beam 13 and chassis 30. Alternatively, a bolt threaded for wood penetration may be used, passing through a hole in the chassis 30 and driven directly into a wooden second beam 14. Thus, the second portion 22 remains unattached for enabling a portion of the second beam 14 to be deflected.

Overlying the second portion 22, the vise mechanism 9 depends from the chassis 30, and is positioned over the second portion 22 for selectively compressing the second portion 22 against the door panel 2 when inserted in the longitudinal slot 7. Accordingly, the combined door carrier and hanging apparatus 1 is capable of holding a conventional door panel in a fixed position inside the longitudinal slot 7. The vise mechanism 9 is attached to the chassis 30 at the second end 6, which vise 9 when operated deflects the second end 22 of second beam 14 toward the first beam 13, thereby narrowing the slot 7 and hence clamping upon a panel 2 placed therein.

Figure 5:
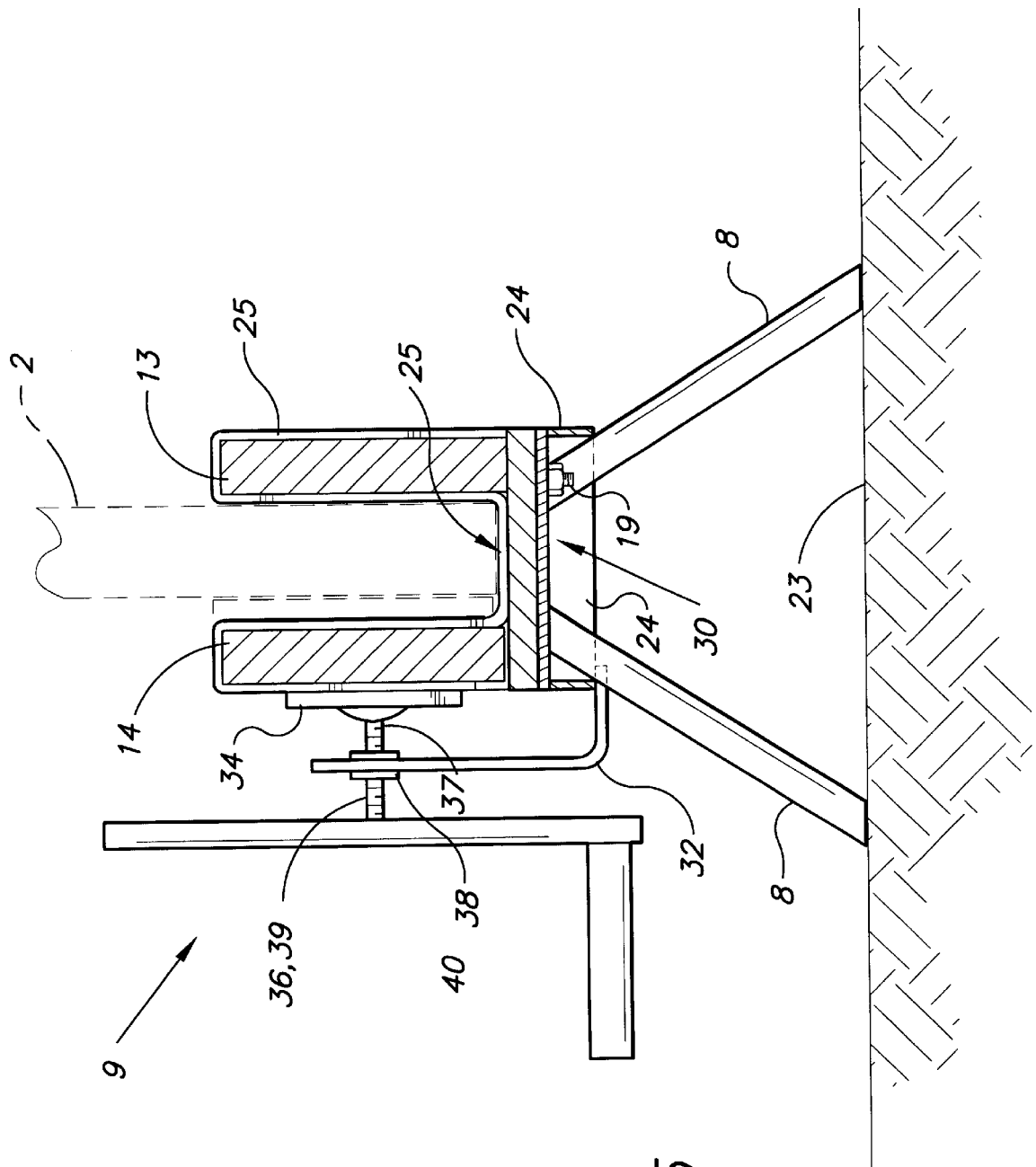
FIG. 5 is a cross-sectional view of the door carrier shown in FIG. 3 taken along line 5—5, showing the carrier in a rest position of the same orientation as in FIG. 4.

As best shown in FIG. 5, the vise mechanism 9 comprises an arm 32 depending from the chassis 30 outwardly and generally proximate to the second beam 14. The arm may be an angle iron or other appropriately rigid material which provides a support for traditional vise elements. The vise mechanism 9 further comprises a plate 34 attached to a proximate end 37 of a threaded shaft 36, which shaft 36 passes through the arm 32 and terminates at a distal end 39, which is attached to a handle 40. The arm 32 may include a matingly threaded bushing 38, such as a simple nut welded to an angle iron serving as arm 32, or the arm 32 may simply be matingly threaded. Regardless of the structure, the vise mechanism 9 should accomplish the objective of selectively driving the plate 34 against the beam 14 in a reversible manner.

To prevent marring and scuffing of the door panel 2, a cushioning web material 25, such as carpet, foam or other bumper, is wrapped over the beams 13,14 to form a protective barrier.

Preferably, the cushion 25 should be durable to endure the stress of repeatedly inserting and removing conventional door panels from the elongated slot 7.

Further details relating to the chassis 30 include a plurality of floor engaging foot members 8 which are rigidly attached to the bottom of the elongated carrier structure 4 near the second end 6. In the preferred embodiment, two feet 8 maintaining the second end 6 in a fixed spaced relation from the floor 23 when the elongated carrier structure 4 is resting horizontally along its length L on the floor 23. Each of the floor engaging foot members 8 may be a rod affixed to the chassis 30 and flaring to form a V-shape relative to the chassis 30. This permits both a steady foot, as well as a pair of handles for handling the elongated carrier structure 4 during transport of a door panel.

At the first end 5, the axle 10 passes through the chassis 30 and the floor engaging wheels 11 are mounted at opposite ends of the axle 10, enabling the elongated carrier structure 4 to be rolled on the first end 5. Also, the wheels 11 have a diameter sized to maintain the chassis 30 in a substantially parallel relation with the floor 23 when at rest, sized to approximate the distance that the foot members 8 elevate the second end 6 from the floor. Preferably, each of the floor engaging wheels 11 are approximately 8 inches in diameter for enabling the combined door carrier and hanging device to be rolled easily over cables and the like that may lie across the floor 23. Additionally, the 8 inch diameter wheels enable the elongated carrier structure 4 to be effectively spaced relative to the floor 23 so that when the carrier structure 4 is rotated to a vertical position with a conventional door panel 2 inserted therein, the conventional door panel 2 is positioned to permit instant installation of the door onto a conventional door frame (not shown).

It is to be understood that the present invention is not limited to the sole embodiment described above, but encompasses any and all embodiments within the scope of the following claims.

We claim:

1. A combined door carrier and hanging device comprising:

an elongated carrier structure having a first end and a second end, said carrier structure including an elongated slot formed therein, wherein said slot is rigid at the first end and flexible at the second end to facilitate insertion of a conventional door panel into the elongated slot;

a vise mechanism attached to said carrier structure at the second end for selectively compressing said second end together onto a conventional door panel inserted therebetween;

at least one floor engaging foot member mounted on said carrier structure at the second end for maintaining the second end in a fixed distance from a floor when said carrier structure is positioned horizontally in relationship to the floor;

an axle mounted to said elongated carrier structure at said first end; and two floor engaging wheels mounted on opposing ends of said axle for maintaining said elongated carrier structure in substantially parallel relation with the floor while enabling said elongated carrier structure to be rolled.

2. The combined door carrier and hanging device according to claim 1, wherein said elongated carrier structure is constructed of wood.

3. The combined door carrier and hanging device according to claim 1, wherein said elongated carrier structure comprises a chassis having a length, said chassis including a first beam and a second beam mounted thereto in a spaced relationship to define the elongated slot.

4. The combined door carrier and hanging device recited in claim 3, wherein said first beam is rigidly affixed to said chassis over a substantial portion of its length.

5. The combined door carrier and hanging device recited in claim 3, wherein said second beam comprises a first portion and a second portion, the first portion extending approximately ⅓ the length of said chassis and being rigidly affixed to said chassis, the second portion being unattached to said chassis for enabling the second portion to be deflected by said vise mechanism.

6. The combined door carrier and hanging device recited in claim 2 further comprising a cushioning web material wrapped around said first beam and second beam for protecting a door panel from marring and scuffing.

\* \* \* \* \*